United States Patent Office 2,818,874
Patented Jan. 7, 1958

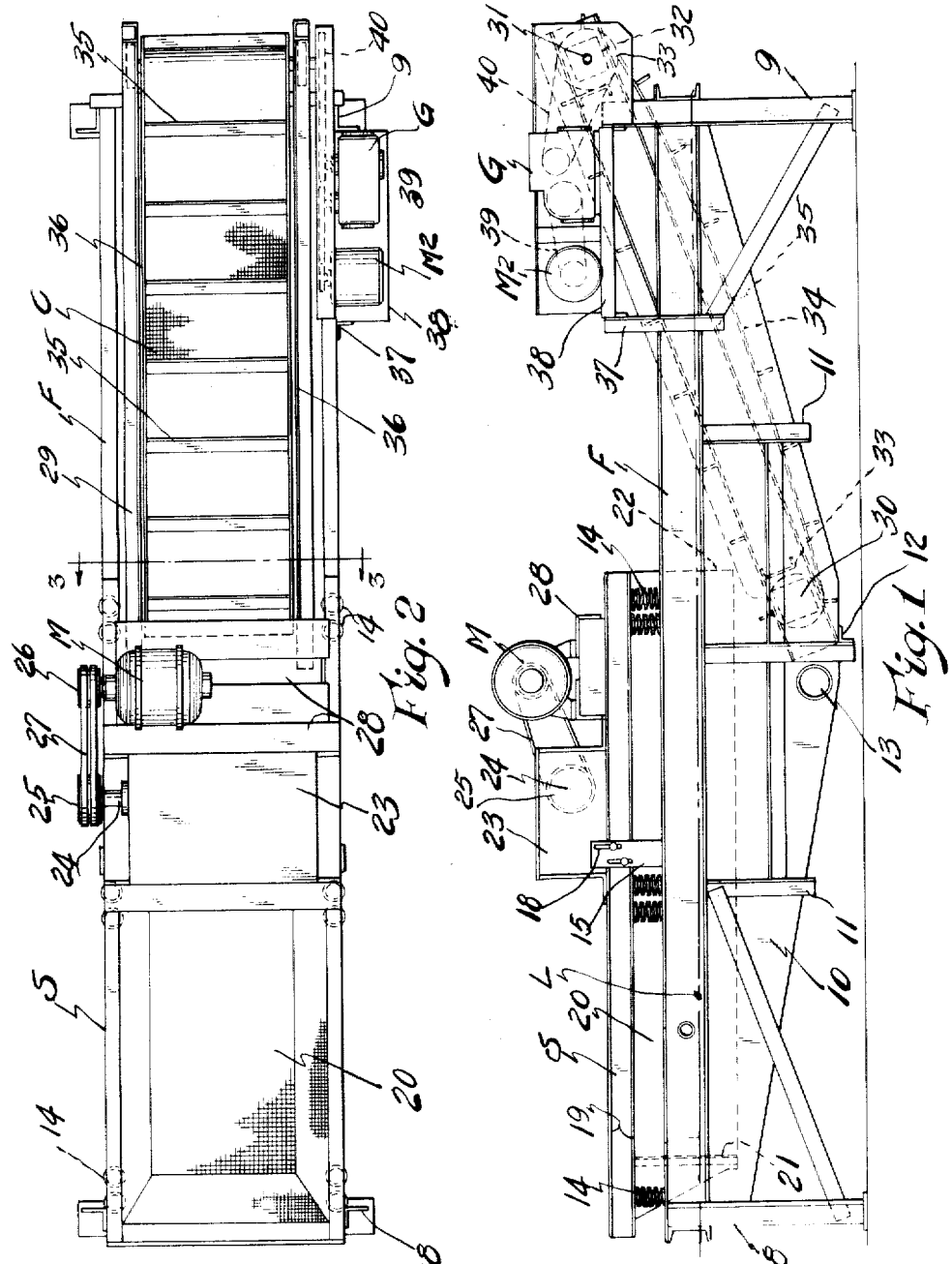

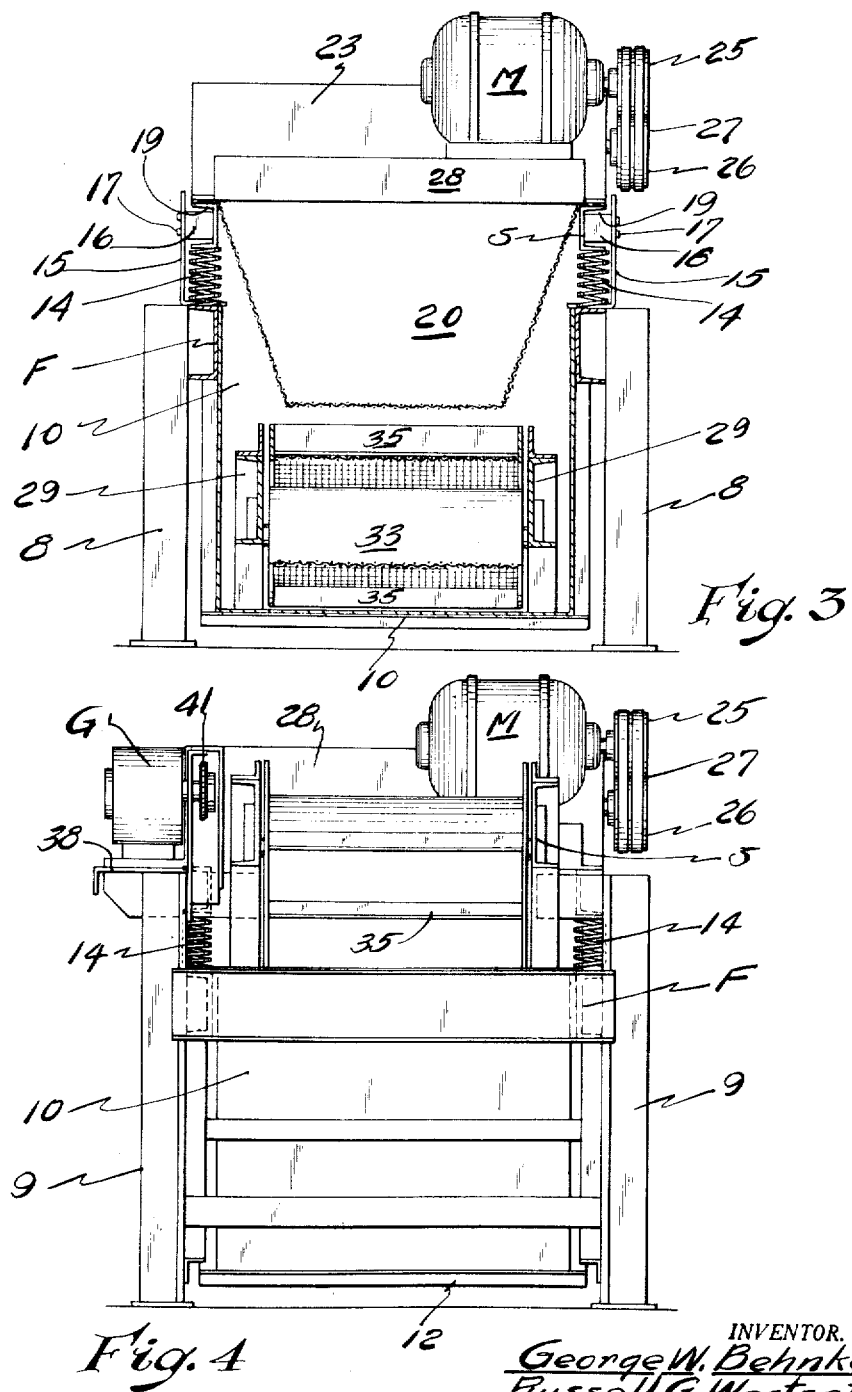

2,818,874
VIBRATORY PARTS WASHER AND DEGREASER

George W. Behnke and Russell G. Westcott, Durand, Mich., assignors to Simplicity Engineering Co., Durand, Mich.

Application January 9, 1956, Serial No. 557,978

3 Claims. (Cl. 134—133)

This invention relates to a parts washing apparatus for cleaning and washing large quantities of small parts such as stampings, screw machine parts, and other small pieces, to remove grease, small chips and particles present on the parts or in openings and pockets therein as they come from machines.

In the machining, turning and/or stamping of small parts, small particles, turnings, grindings, etc., hang in the pockets and ridges present in said parts, further, oil is frequently applied, in large quantities, to the work and to the tools of the lathes, automatic screw machines, etc., and inasmuch as the parts are also coated with grease or an oil film it is desirable for future handling and later application, that all of these particles, oil, etc., be washed free of the parts.

Inasmuch as the parts put through the washer are relatively small in size and of large volume, it is desirable that they be dumped directly into the liquid or solvent, which is vibrated to agitate and turn them with relation to each other, so that any pockets may be cleaned, and the parts completely and thoroughly washed.

One of the prime objects of the invention is to design a simple, practical and efficient washer apparatus including a suspended wire basket into which the parts are dumped, and provide means for agitating said basket to turn them with relation to each other and move them along a path of travel through the washer.

Another object is to provide means extending into said tank beneath the discharge end of the basket for conveying the cleaned parts out of the tank after they have been washed.

Still a further object is to design a machine which can be readily manufactured and assembled and which is capable of extremely large production.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of our new parts washer.

Fig. 2 is a top plan view thereof.

Fig. 3 is a transverse sectional view taken on the line 3—3 of Fig. 2.

Fig. 4 is an end elevational view of the discharge end of the machine.

Referring now more specifically to the drawings in which we have shown the preferred embodiment of our invention.

The letter F indicates the main frame of the washer which is supported on front and rear legs 8 and 9 as usual.

A tank 10 is hung in the main frame F and is further supported by vertical members 11 having transversely disposed angles 12 spanning the tank and bearing against the bottom thereof at points intermediate its length.

The bottom of the tank 10 is also pitched as shown and a discharge opening 13 is provided at the lowest point to permit drainage and for removal of any sludge, etc. that may accumulate therein.

A channeled screen frame S is mounted over one end of the main frame F, and coil springs 14 are interposed between said frames at spaced apart points as shown. Opposed, preferably flat, bar sections 15 are secured to the main frame F in any desired manner and project upwardly therefrom, and blocks or bumpers 16 are adjustably secured thereto by means of studs 17 which are in turn mounted in slotted openings 18 provided in said bars. These blocks being preferably formed of rubber and resting between the projecting flanges 19 of the channel frame S.

A depending wire basket 20 has its upper edges secured to the frame S in any desired manner, this frame being hoppered as shown, and depending stays 21 are provided for reinforcing said basket, the one end of which is open as at 22, and the bottom surface is slightly pitched to cause the parts to travel toward the open end as the screen is vibrated.

A sheet metal housing 23 is mounted on the screen frame S, and a counterbalanced vibrating shaft 24 is journaled therein, and we do not deem it necessary to show or describe this in detail as it is substantially the same as shown in Patent No. 2,311,814, granted February 23, 1943 to Messrs. Behnke, Westcott & Sandula.

The shaft 24 projects beyond housing 23 and pulleys 25 are provided thereon and are drivingly connected to a motor drive pulley 26 provided on a motor M, by means of belts 27 said motor being secured to supports 28 which span the frame S and is connected to a suitable source of power supply (not shown), and it will be obvious that as the motor is driven the frame S, with attached basket, will be vibrated with relation to the main frame to tumble and travel the parts through the basket, the bottom of which is immersed in the liquid in the tank.

A conveyor C is mounted in the opposite end of the tank 10 in horizontal alignment with the basket 20, said conveyor comprising a frame 29 having spaced apart shafts 30 and 31 journaled in bearings 32 provided thereon. Rollers 33 are mounted on the shafts 30 and 31 and a perforated or screen conveyor belt 34 is trained thereover, and has spaced apart angles 35 spanning said conveyor with articulated edges 36, these edges and angles forming pockets thereon so that the washed parts may be conveyed upwardly and out of he tank as the washer is operated.

The rear legs 9 project a predetermined distance above the top of the main frame F and a vertical brace 37 is also provided on the frame F, both of which project above the main frame, a horizontally disposed member 38 connecting said vertical brace and leg to form a platform or support on which a motor M2 is mounted.

A gear reduction unit G is also mounted on platform 38 and the motor M2 is drivingly connected to the unit G by means of a belt 39, another drive 40 drivingly connecting the reduction unit G with a pulley 41 provided on the shaft 42 and it will be readily apparent that as the motor M2 is energized that the conveyor C will be driven.

In practice the tank 10 is filled with a liquid or solvent, about to a level indicated at L in Fig. 1 of the drawings, and when it is desired to operate the machine, the parts to be cleaned are dumped in batches or a continuous stream into the front end of the wire basket 20. The motors M and M2 are energized, the motor M driving the mechanism to vibrate the basket 20 to agitate the small parts and move them along the basket to discharge from the open end. The parts drop onto conveyor C, which extends beneath the open end of said basket, and the motor M2 drives the conveyor to bring the parts up and discharges them into a vat or other receptacle (not shown).

The machine can be manually fed or if desired, a conveyor (not shown), may be connected to the front end of the main frame for discharging the parts directly into the perforated basket.

From the foregoing description it will be obvious that we have perfected a very simple, practical and economical parts washer, which vibrates and turns the parts as they are washed and discharges them into a conveyor for conveying to a vat or other receptacle.

What we claim is:

1. A parts washing device including a main frame, a liquid tank suspended therein, a vibrating frame mounted on the main frame and provided with a perforated basket, having one open end depending into said tank, an inclined conveyor mounted in said tank in the rear of the basket, with its one end disposed beneath the open end thereof to receive the parts discharged from said basket, means for vibrating said vibrating frame, means for driving said conveyor to convey the parts out of said tank, resilient means inserted between the main frame and the screen frame, upwardly projecting members provided on the main frame, and means adjustable on said members and loosely engaging said screen frame for limiting movement of the vibrating frame with relation to the main frame.

2. A parts washing device comprising a main frame, a liquid tank supported by said main frame, a vibratable frame including an open ended perforate basket, means yieldably supporting said vibratable frame on said main frame so that said basket depends into said liquid tank, vibrating means connected to said vibratable frame for vibrating the latter, means interconnected between said vibratable frame and said main frame and being adjustable relatively to the latter to vary the amplitude of vibration of said vibratable frame, conveyor means mounted on said main frame in a posittion to receive washed parts from said vibratable frame, and means for driving said conveyor means.

3. A device as set forth in claim 2 which said vibrating frame includes a pair of parallel frame members of generally channel shape and in which the means for varying the amplitude of vibration of the vibratable frame includes resilient blocks received by said channel shaped members.

References Cited in the file of this patent

UNITED STATES PATENTS

| | | |
|---|---|---|
| 566,534 | Pike | Aug. 25, 1896 |
| 574,606 | Heideman | Jan. 5, 1897 |
| 2,464,216 | Devol | Mar. 15, 1949 |
| 2,538,285 | Swayze | Jan. 16, 1951 |
| 2,618,577 | Bash | Nov. 18, 1952 |
| 2,662,851 | Jones | Dec. 15, 1953 |